(12) United States Patent
Azar et al.

(10) Patent No.: US 11,888,348 B2
(45) Date of Patent: Jan. 30, 2024

(54) ELECTRICAL MACHINE HAVING A SEGMENTED STATOR OR ROTOR

(71) Applicant: Siemens Gamesa Renewable Energy A/S, Brande (DK)

(72) Inventors: Ziad Azar, Sheffield (GB); Richard Clark, Worrall Sheffield (GB); Alexander Duke, Sheffield (GB); Arwyn Thomas, Cheshire (GB)

(73) Assignee: SIEMENS GAMESA RENEWABLE ENERGY A/S

( * ) Notice: Subject to any disclaimer, the term of this patent is extended or adjusted under 35 U.S.C. 154(b) by 375 days.

(21) Appl. No.: 17/284,891

(22) PCT Filed: Oct. 18, 2019

(86) PCT No.: PCT/EP2019/078411
§ 371 (c)(1),
(2) Date: Apr. 13, 2021

(87) PCT Pub. No.: WO2020/088956
PCT Pub. Date: May 7, 2020

(65) Prior Publication Data
US 2021/0359558 A1 Nov. 18, 2021

(30) Foreign Application Priority Data
Oct. 30, 2018 (EP) ..................... 18203388

(51) Int. Cl.
*H02K 1/14* (2006.01)
*H02K 1/16* (2006.01)
(Continued)

(52) U.S. Cl.
CPC ............. *H02K 1/148* (2013.01); *H02K 1/165* (2013.01); *H02K 1/265* (2013.01); *H02K 3/28* (2013.01);
(Continued)

(58) Field of Classification Search
CPC ........ H02K 1/148; H02K 1/165; H02K 1/265; H02K 2213/09; H02K 2213/12; H02K 3/28; Y02E 10/72
See application file for complete search history.

(56) References Cited

U.S. PATENT DOCUMENTS 4,241,274 A * 12/1980 Brammerlo ............... H02K 1/16
310/179
5,592,731 A * 1/1997 Huang ................. H02K 15/085
29/596
(Continued)

FOREIGN PATENT DOCUMENTS

CN      1842953 A    10/2006
CN    101459366 A     6/2009
(Continued)

OTHER PUBLICATIONS

European Search Report dated Apr. 17, 2019 for Application No. 18203388.6.
(Continued)

*Primary Examiner* — Naishadh N Desai
(74) *Attorney, Agent, or Firm* — Schmeiser, Olsen & Watts LLP

(57) ABSTRACT

Provided is a stator for an electrical machine including a plurality of segments, wherein
in order to reduce torque harmonics and power harmonics due to the interposed circumferential gap between two circumferentially adjacent stator segments,
at least one of the two end teeth of each stator segment includes a circumferential protrusion at the respective tooth radial end, the circumferential protrusion protruding from the respective side face towards the respective circumferential end.

9 Claims, 4 Drawing Sheets

(51) Int. Cl.
  *H02K 1/26* (2006.01)
  *H02K 3/28* (2006.01)
(52) U.S. Cl.
  CPC ..... *H02K 2213/09* (2013.01); *H02K 2213/12* (2013.01)

(56) References Cited

U.S. PATENT DOCUMENTS

| | | |
|---|---|---|
| 6,265,804 B1 | 7/2001 | Nitta et al. |
| 2006/0091758 A1 | 5/2006 | Ahn |
| 2009/0066183 A1* | 3/2009 | Aramaki ................ H02K 1/148 310/216.008 |
| 2012/0074797 A1 | 3/2012 | Petter et al. |
| 2012/0263612 A1* | 10/2012 | Matsuzaki ............. H02K 1/148 310/215 |
| 2015/0137652 A1 | 5/2015 | Petter et al. |
| 2015/0200571 A1 | 7/2015 | Katou et al. |

FOREIGN PATENT DOCUMENTS

| | | |
|---|---|---|
| CN | 103210566 A | 7/2013 |
| CN | 105406629 A | 3/2016 |
| GB | 2508022 A | 5/2014 |
| JP | 5644880 B2 | 12/2014 |
| WO | 2017012707 A1 | 1/2017 |
| WO | 2017101637 A1 | 6/2017 |

OTHER PUBLICATIONS

International Search Report and the Written Opinion of the International Searching Authority dated Dec. 3, 2019 for Application No. PCT/EP2019/078411.

\* cited by examiner

ELECTRICAL MACHINE HAVING A SEGMENTED STATOR OR ROTOR

CROSS-REFERENCE TO RELATED APPLICATIONS

This application claims priority to PCT Application No. PCT/EP2019/078411, having a filing date of Oct. 18, 2019, which is based-off of EP Application No. 18203388.6, having a filing date of Oct. 30, 2018, the entire contents both of which are hereby incorporated by reference.

FIELD OF TECHNOLOGY

The following relates to an electrical machine having a stator or a rotor with a segmented geometry, i.e., a stator or a rotor including a plurality of stator segments circumferentially joined together.

BACKGROUND

In large electrical machines, segmentation of the stator and/or the rotor structure is required to ease manufacturing and transportation. This is in particular required for stators or rotors where a winding is provided. Due to manufacturing tolerances and limitations, tolerance circumferential gaps are typically designed between segments.

The presence of the segment circumferential gaps can lead to differences in the electromagnetic performance compared to a single stator and often leads to issues with undesirable torque harmonics and output power harmonics of the electrical machine, which can lead to high levels of vibration and acoustic noise as well as losses and complicated control. It is therefore important to control the shape and dimensions of the circumferential gaps in order to minimize the detrimental effect on the performance introduced by the segmentation.

For electrical machines with half teeth at the circumferential ends of the segments (typically integral slot electrical machines with distributed windings), the segment circumferential gaps can be controlled in shape and dimensions by conveniently shaping and dimensioning the half teeth. This has no detrimental effects on the area of slot used for housing the copper windings and therefore the torque and output power of the electrical machine is not affected.

For electrical machines where a half slot is present at each circumferential end of a segment (typically fractional slot machines with concentrated windings), the slot cannot be modified, for example by decreasing them in width, as this would reduce the area for the windings. A reduction in winding area would increase the resistance in this particular coil and therefore increase the loss. By having an imbalance in losses between the coils, a hot spot would be expected to form in the circumferential end coil, thus limiting the operating point of the whole machine from a thermal perspective.

In the latter case, another method of dimensioning the desired segment circumferential gap is to reduce the width of the final tooth in each segment. This ensures that the winding area remains identical or similar to all the other slots thus eliminating the risk of hotspots, however, it potentially introduces further torque harmonics and power harmonics due to the resulting uneven distribution of teeth around the airgap circumference. It is desired to avoid uneven distribution of teeth around the airgap circumference and minimize torque harmonics and power harmonics due to stator segmentation affecting performance of electrical machines.

U.S. Pat. No. 5,592,731A (Haung Hao et al) discloses a stator core of an electrical machine, formed of multiple segments formed of pressed double-coated iron powder which have a plurality of radially oriented teeth. Individual segments are circumferentially combined to form a cylindrical stator or armature with windings. FIG. 1 shows an individual segment having half-slots at respective circumferential ends, with teeth protruding radially inwards. Plurality of teeth are arranged with identical protrusions at teeth tips.

Patent document JP5644880B2 (Mitsubishi Electric Corp) describes a rotational electrical machine capable of reducing cogging torque and torque ripple due to distortion of a stator core or magnetic anisotropy of an iron core material. The stator is formed of six segments comprising six teeth with 3-phase winding wound concentrically around the teeth to reduce torque pulsations (FIG. 2). FIGS. 8 and 9 show individual segments having half-slots at respective circumferential ends, with teeth protruding radially inwards. Plurality of teeth are arranged with identical T-shape protrusions at teeth tips.

Patent application WO2017/012707A1 (Ziehl-Abegg SE) discloses a core body as a part of stators and/or rotors of electric machines having a main body with grooves (slots) along the circumference thereof. At least some of the grooves (slots) have an asymmetrical outline. The core body is provided with at least one mirror axis, relative to which the asymmetrical grooves are arranged mirror-symmetrically in the core body. The grooves (slots) are arranged in groove groups. The mirror axis divides the core body into at least two segments comprising at least one groove group. The groove groups are mirror-symmetrical about the mirror axis.

Patent application GB2508022A (Jaguar Land Rover LTD) discloses an electric machine comprising a substantially circular rotor and stator, wherein the stator comprises at least one substantially arcuate segment. The end portions of the segments which form tabs may be slotted to engage mounting hooks or the hooks may be arranged to engage the inner radial surface of the segment. FIG. 4 shows an individual stator segment with half-sots at respective circumferential ends, with teeth protruding radially inwards.

SUMMARY

An aspect relates to provide a new segment design, for controlling the shape and dimensions of the circumferential gaps in segmented stators or rotors having half slots at the circumferential ends of the segments, in order to minimize the detrimental effects above described.

According to embodiments of the invention, it is provided a stator for an electrical machine including a plurality of segments, wherein each segment includes a segment body circumferentially extending about a longitudinal axis (Y) of the stator segment between two circumferential ends, the segment body including:

a plurality of teeth protruding according to a radial direction orthogonal to the longitudinal axis (Y) from a yoke of the segment body to respective tooth radial ends, each tooth circumferentially extending between two respective side faces, the plurality of teeth being circumferentially distributed between two end teeth of the plurality of teeth, the plurality of teeth comprising at least one intermediate tooth circumferentially comprised between the end teeth, a plurality of slots circumferentially interposed between the teeth of the stator, the plurality of slots being circumferentially distributed between two end slots, each end slot being circumferentially comprised between a respective end tooth and a respective circumferential end, the plurality of slots comprising a plurality of intermediate slots circumferentially comprised between the two end slots, wherein each segment comprises a coil winding arranged in the segment body, the coil winding including at least two side coils respectively housed in the end slots, at least one of the two side coils being radially interposed between the circumferential protrusion and the yoke of the segment, wherein the plurality of segments are circumferentially joined together at their ends in such a way that a segment tolerance circumferential gap is interposed between two circumferentially adjacent stator segments, characterized in that in order to reduce torque harmonics and power harmonics due to the interposed circumferential gap between two circumferentially adjacent stator segments, at least one of the two end teeth of each stator segment includes a circumferential protrusion at the respective tooth radial end, the circumferential protrusion protruding from the respective side face towards the respective circumferential end.

The above described segment may be advantageously integrated in a segmented stator or rotor of an electrical machine, either generator or motor. For example, the above described segment may be advantageously integrated in the stator of an electrical generator for a wind turbine.

According to embodiments of the present invention, the presence of the circumferential protrusion leads to a reduction in certain cogging and loaded torque harmonics, as well as in the voltage and power harmonics.

Of particular importance is the reduction in cogging torque harmonics when embodiments of the present invention are used in an electrical generator connected to a converter, as the cogging torque harmonics cannot actively be reduced by the converter when the converter is inactive during open circuit.

The circumferential protrusion may have a rectangular or triangular shape in a cross section transversal to the longitudinal axis. The circumferential protrusion may have other shapes in a cross section transversal to the longitudinal axis, different from the rectangular or triangular shape. In order to efficiently reduce cogging torque harmonics, as well as voltage and power harmonics, circumferential protrusions on the end teeth may have a different shape to circumferential protrusions on the intermediate teeth. Each segment includes at least one intermediate tooth circumferentially comprised between two end teeth of the segment. Each segment includes two end teeth, located on circumferential ends of the segment.

According to embodiments of the invention, the second circumferential width at the respective tooth radial end of the end teeth is the same of the circumferential width at the respective tooth radial end of the intermediate teeth. The width of the radial end of the end teeth is so congruous with all of the other intermediate teeth in the segment. As the top of the coil is no wider than the other teeth in the segment, no special coil design is required for these end teeth, thus maintaining ease of manufacture, and improving the mechanical support for coils at the end of the segment.

BRIEF DESCRIPTION

Some of the embodiments will be described in detail, with reference to the following figures, wherein like designations denote like members, wherein.

DETAILED DESCRIPTION

Figure 1:
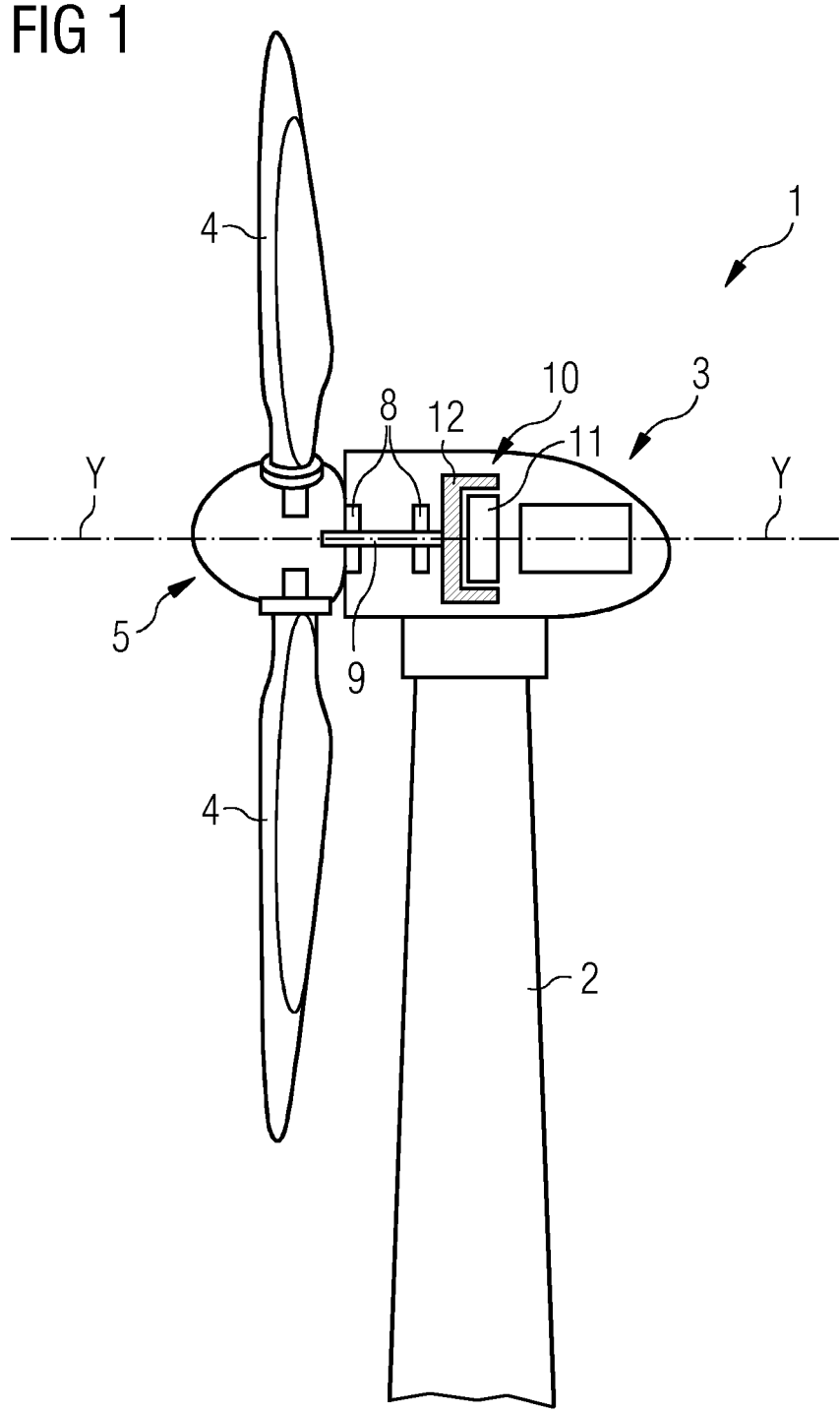
FIG. 1 shows a schematic section of a wind turbine including an electrical generator with a stator geometry according to the present invention.

The illustrations in the drawings are schematic. It is noted that in different figures, similar or identical elements are provided with the same reference signs.

FIG. 1 shows a wind turbine 1 according to embodiments of the invention. The wind turbine 1 comprises a tower 2, which is mounted on a non-depicted foundation. A nacelle 3 is arranged on top of the tower 2.

The wind turbine 1 further comprises a wind rotor 5 having two, three or more blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y. Rotational axis Y may coincide with stator longitudinal axis Y.

The blades 4 extend radially with respect to the rotational axis Y.

The wind turbine 1 comprises a concentrated winding electrical generator 10.

The wind rotor 5 is rotationally coupled with the electrical generator 10 by means of a rotatable main shaft 9.

According to other possible embodiments of the present invention (not represented in the attached figures), the wind rotor 5 is rotationally coupled directly with the electrical generator 10 (direct-drive generator configuration).

A schematically depicted bearing assembly 8 is provided in order to hold in place the rotor 5. The rotatable main shaft 9 extends along the rotational axis Y. The permanent magnet electrical generator 10 includes a stator 11 and a rotor 12. The rotor 12 is radially external to the stator 11 and is rotatable with respect to the stator 11 about the rotational axis Y. According to other embodiments of the present invention (not shown) the rotor is radially internal to the stator 11.

According to other possible embodiments of the present invention (not represented in the attached figures), embodiments of the present invention can be applied to any electrical generator or motor which has concentrated winding topology, for example geared drive-trains or electrical machine of the synchronous or asynchronous types.

According to other possible embodiments of the present invention (not represented in the attached figures), embodiments of the present invention can be applied to any electrical generator or motor which has a double-layer coil distributed winding.

Figure 2:
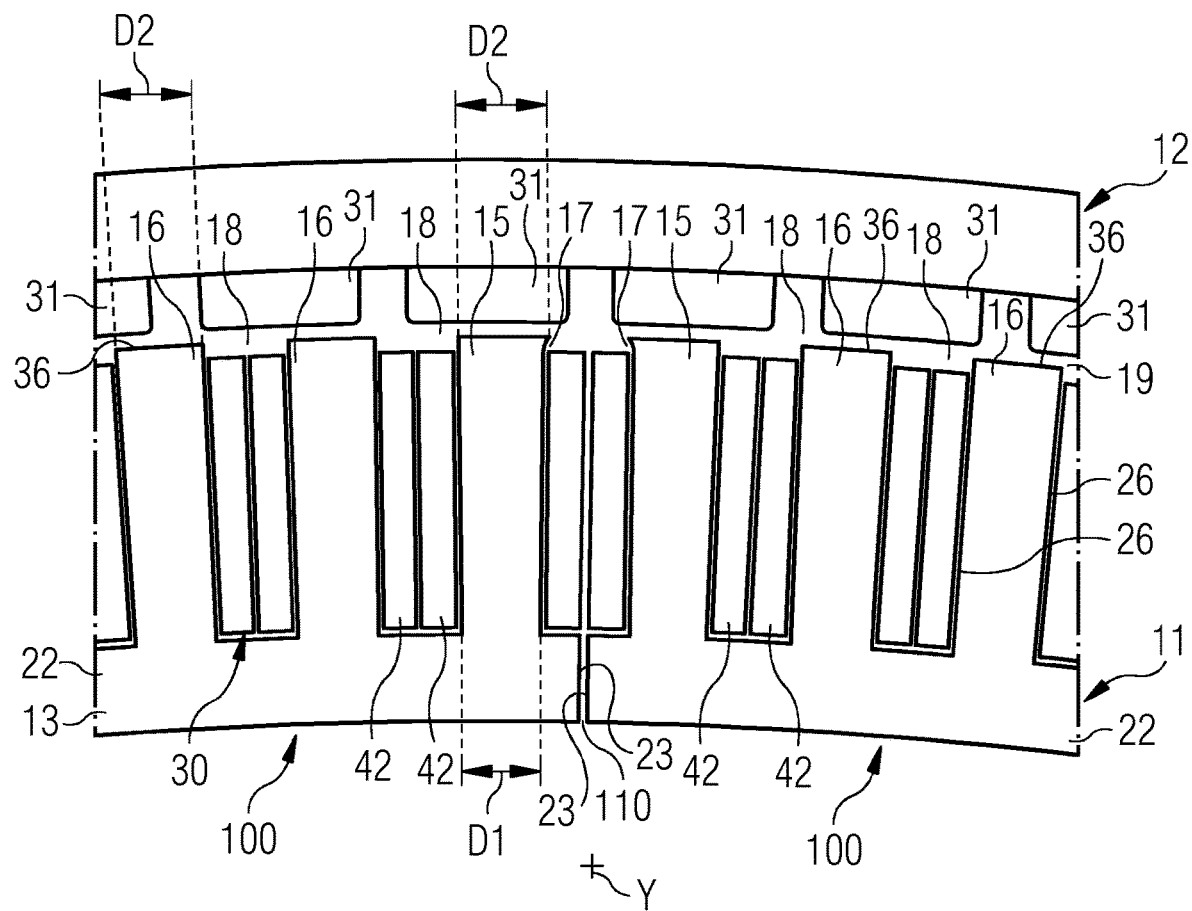
FIG. 2 shows a partial cross section of an electrical generator in accordance with the present invention.

FIG. 2 shows a partial schematic view of a cross section, orthogonal to the rotational axis Y, of the electrical generator 10 with radially internal stator 11 and the radial external rotor 12. The electrical generator 10 includes a circumferential air gap 19, radially interposed between the stator 11 and the rotor 12. The rotor 12 includes a plurality of circumferentially distributed permanent magnets 31. The circumferential air gap 19 is radially interposed between the permanent magnets 31 and the stator 11.

The stator 11 includes a plurality of circumferential segments 100 (two segment 100 are shown in FIG. 2), which are circumferentially joined together in such a way that a circumferential gap 110 is interposed between two circumferentially adjacent stator segments 100. The stator 11 has a toothed structure, as descried in the following, for housing a coil winding 30 arranged in each of the stator segments 100.

According to other possible embodiments of the present invention (not represented in the attached figures), embodiments of the present invention and the description which follows is applied to a rotor of an electrical machine.

Each segment 100 includes a segment body 22 circumferentially extending about the longitudinal axis Y between two circumferential ends 23. The segment body 22 includes a yoke 13, a plurality of teeth 15, 16 and a plurality of slots 17, 18.

Each tooth 15, 16 protrudes from the yoke 13 according to a radial direction orthogonal to the longitudinal axis Y. The plurality of teeth 15, 16 is circumferentially distributed between two end teeth 15 of the plurality of teeth 15, 16. Each end tooth 15 circumferentially extends between two respective side faces 25. The plurality of teeth 15, 16 comprises at least one intermediate tooth 16 (two intermediate teeth 16 for each segment 100 are shown in FIG. 2) circumferentially comprised between the end teeth 15. Each intermediate tooth 16 circumferentially extends between two respective side faces 26.

The plurality of slots 17, 18 are circumferentially interposed between the teeth 15, 16 and circumferentially distributed between two end slots 17. Each end slot 17 is circumferentially comprised between a respective end tooth 15 and a respective circumferential end 23 of the segment body 22. The plurality of slots 17, 18 comprise a plurality of intermediate slots 18 (two complete intermediate slot 18 for each segment 100 are shown in FIG. 2) circumferentially comprised between the two end slots 17.

The coil winding 30 is a double-layer winding including two side coils 41 respectively housed in the end slots 17 and two coils 42 in each of the intermediate slots 18. Each of the side coils 41 and of the coils 42 extends radially from the yoke towards the radial external end of the respective slot 17, 18, i.e., towards the circumferential air gap 19.

According to possible embodiments of the present invention, the coil winding 30 may by a coil concentrated winding or a double-layer coil distributed winding.

The end teeth 15 includes a circumferential protrusion 45 at the respective tooth radial end 35, the circumferential protrusion 45 protruding from the respective side face 25 towards the respective circumferential end 23.

Figure 3:
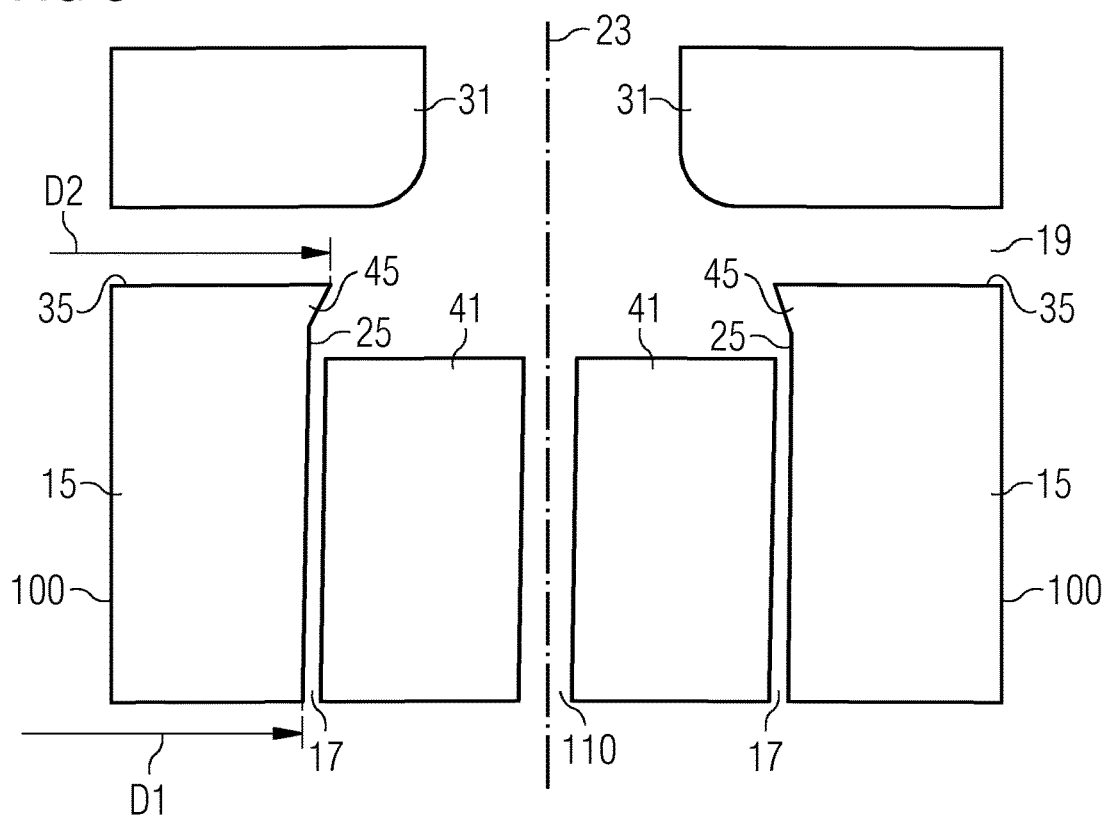
FIG. 3 shows a partial cross section of a first embodiment of the electrical generator of FIG. 2.
Figure 4:
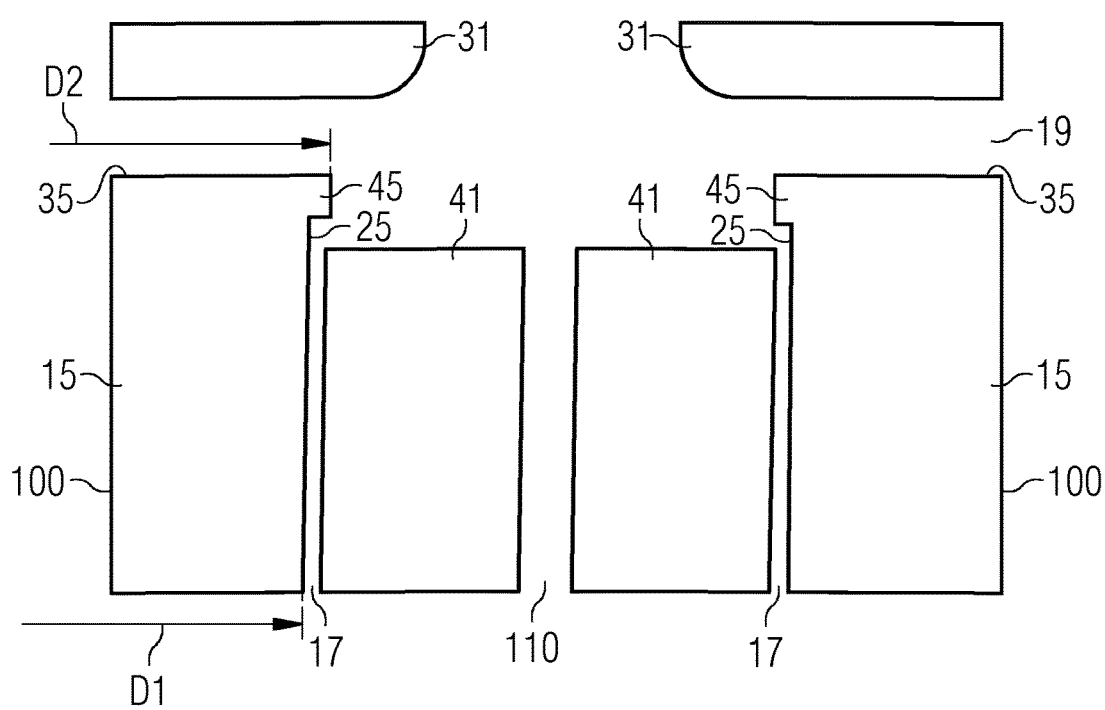
FIG. 4 shows a partial cross section of a second embodiment of the electrical generator of FIG. 2.

According to the embodiment shown in FIG. 3 and FIG. 4, the end teeth 15 have a first circumferential width D1 at the yoke 13 and a second circumferential width D2 at the respective tooth radial end 35. The second circumferential width D2 is greater than the first circumferential width D1.

The difference in the circumferential width D1, D2 of the end teeth 15 is caused by the respective circumferential protrusion 45 at the respective tooth radial end 35.

According to other embodiments (not shown in the attached figures) the second circumferential width D2 is lower than the first circumferential width D1. Alternatively, the first and the second circumferential width D1, D2 may be equal.

The second circumferential width D2 at the respective tooth radial end 35 of the end teeth 15 is the same of the circumferential width D2 at the respective tooth radial end 36 of the intermediate teeth 16.

According to other embodiments (not shown in the attached figures) the circumferential width D1, D2 of the end teeth 15 is different from the circumferential width of the intermediate teeth 16.

According to the embodiment shown in FIG. 3 and FIG. 4, the circumferential protrusion 45 is radially positioned in such a way in each that in each end slot 17 the respective side coil 41 is radially interposed between the circumferential protrusion 45 and the yoke 13 of the respective segment 100.

The dimensions of the circumferential protrusion 45 in the radial and in the circumferential direction can be adjusted to obtain the most favorable results in terms of harmonic reduction in the torque, power and voltages of the electrical machine 10.

With reference to the embodiment of FIG. 3, the circumferential protrusion 45 has a triangular shape in a cross section (the cross section shown in FIG. 4) transversal to the longitudinal axis Y, i.e., the circumferential protrusion 45 connects with a chamfer the respective tooth radial ends 35 and the respective side face 25 of the respective end tooth 15.

With reference to the embodiment of FIG. 4, the circumferential protrusion 45 has a rectangular shape in a cross section (the cross section shown in FIG. 3) transversal to the longitudinal axis Y, i.e., the circumferential protrusion 45 connects with a step the respective tooth radial ends 35 and the respective side face 25 of the respective end tooth 15.

According to other embodiments of the present invention (not shown) the circumferential protrusion 45 has a different shape from those of FIGS. 3 and 4, i.e., not rectangular and not triangular.

Figure 5:
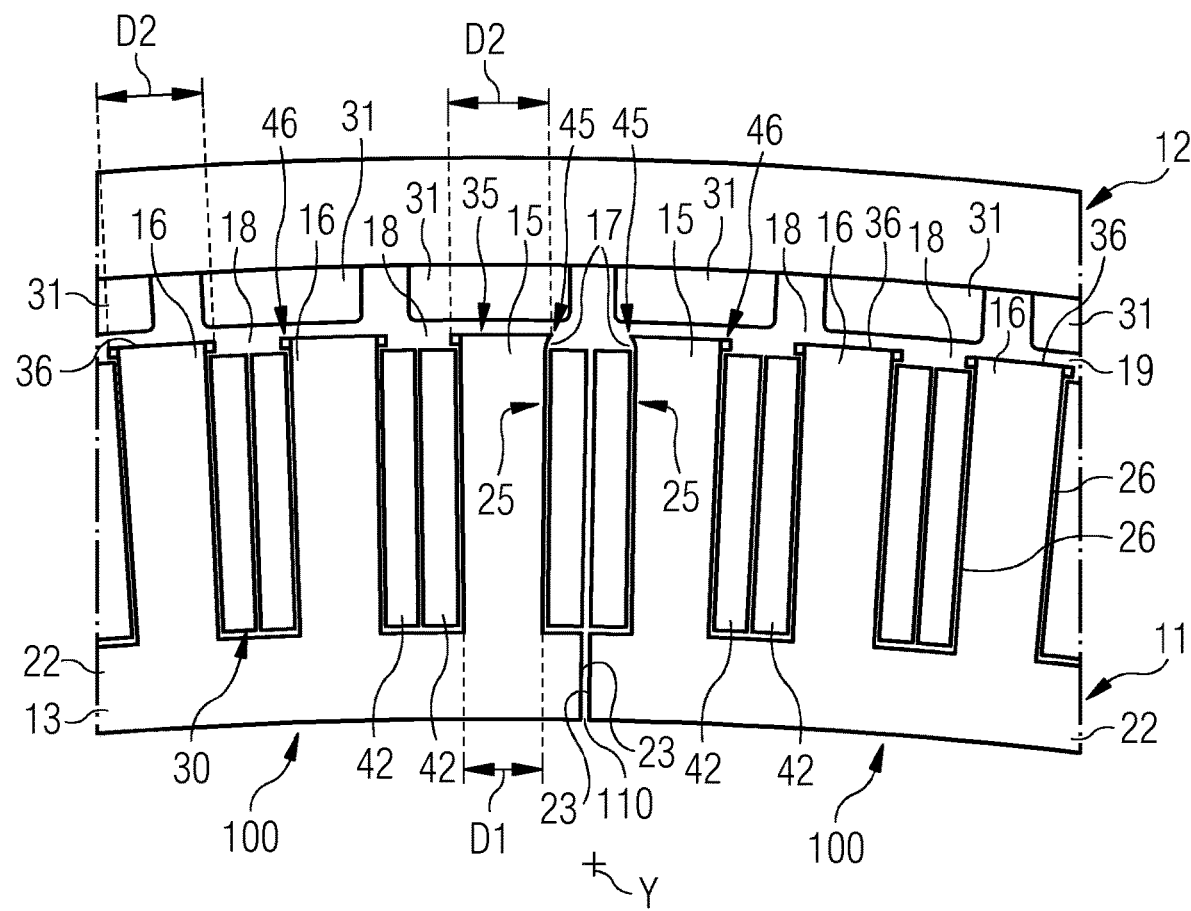
FIG. 5 shows a partial cross section of an electrical generator in accordance with an embodiment of the invention.

According to the embodiment shown in FIG. 5, the end teeth 15 include triangular circumferential protrusions 45 at the respective teeth radial ends 35, the circumferential protrusions 45 protruding from the respective side faces 25 towards the respective circumferential ends 23. Furthermore, the end teeth 15 include rectangular protrusions 46, at the respective teeth radial ends 35, the rectangular protrusions 46 protruding from the respective side faces 25 towards the intermediate slots 18. The intermediate teeth 16 include rectangular protrusions 46. In order to reduce torque harmonics and power harmonics due to the interposed circumferential gap 110 between two circumferentially adjacent stator segments 100, circumferential protrusions at the end teeth 15 differ in shape compared to circumferential protrusions at the intermediate teeth 16. Illustrated in FIG. 5 is one such example, but other possibilities exist. For example, each end tooth 15 may include, on both circumferential sides of the end tooth 15, triangular circumferential protrusions (not depicted in the figure) while the intermediate teeth 16 may include all rectangular circumferential protrusions 46. Shape of circumferential protrusion at each end tooth 15, protruding from the respective side face 25 towards the respective circumferential end 23 is chosen so as to reduce torque harmonics and power harmonics due to the interposed circumferential gap 110 between two circumferentially adjacent stator segments 100. Circumferential protrusions at the intermediate teeth 16 may all be of the same shape. In order to achieve the desired reduction in harmonics, circumferential protrusion 45 at the at least one end tooth 15 of each stator segment 100, facing the respective circumferential end 23, differs in shape to circumferential protrusions 46 at the intermediate teeth 16. As depicted in FIG. 5, the circumferential width D2 of the end teeth 15 is the same as the circumferential width D2 of the intermediate teeth 16.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A stator for an electrical machine including a plurality of segments,
   wherein each segment includes a segment body circumferentially extending about a longitudinal axis of the stator segment between two circumferential ends, the segment body including:
   a plurality of teeth protruding according to a radial direction orthogonal to the longitudinal axis from a yoke of the segment body to respective tooth radial ends, each tooth circumferentially extending between two respective side faces, the plurality of teeth being circumferentially distributed between two end teeth of the plurality of teeth, the plurality of teeth comprising at least one intermediate tooth circumferentially comprised between the end teeth,
   a plurality of slots, circumferentially interposed between the teeth of the stator, the plurality of slots being circumferentially distributed between two end slots, each end slot being circumferentially comprised between a respective end tooth and a respective circumferential end, the plurality of slots comprising a plurality of intermediate slots circumferentially comprised between the two end slots,
   wherein each segment comprises a coil winding arranged in the segment body, the coil winding including at least two side coils respectively housed in the end slots, at least one of the two side coils being radially interposed between the circumferential protrusion and the yoke of the segment,
   wherein the plurality of segments are circumferentially joined together at their ends in such a way that a segment tolerance circumferential gap is interposed between two circumferentially adjacent stator segments,
   wherein
   in order to reduce torque harmonics and power harmonics due to the interposed circumferential gap between two circumferentially adjacent stator segments,
   at least one of the two end teeth of each stator segment includes a circumferential protrusion at the respective tooth radial end, the circumferential protrusion protruding from the respective side face towards the respective circumferential end.

2. The stator as claimed in claim 1, wherein the second circumferential width at the respective tooth radial end of the end teeth is the same of the circumferential width at the respective tooth radial end of the intermediate teeth.

3. The stator as claimed in claim 1, wherein the circumferential protrusion has a rectangular shape in a cross-section transversal to the longitudinal axis.

4. The stator as claimed in claim 1, wherein the circumferential protrusion has a triangular shape in a cross-section transversal to the longitudinal axis.

5. The stator as claimed in claim 1, wherein the coil winding is a double-layer winding including two coils in each of the intermediate slots.

6. The stator as claimed in claim 1, wherein the coil winding is a coil concentrated winding or a double-layer coil distributed winding.

7. The stator as claimed in claim 1, wherein the circumferential protrusion at the at least one end tooth differs in shape to circumferential protrusions of the intermediate teeth, the circumferential protrusion protruding from the respective side face towards the respective circumferential end.

8. An electrical machine including the stator as claimed in claim 1.

9. A wind turbine including an electrical generator including the stator as claimed in claim 1.

* * * * *